United States Patent
Schöttler et al.

(10) Patent No.: US 7,753,993 B2
(45) Date of Patent: Jul. 13, 2010

(54) METHOD AND DEVICE FOR TREATING CONTAMINATED WATER

(75) Inventors: Michael Schöttler, Erlangen (DE); Anja Wallmann, Erlangen (DE); Rainer Wulff, Pommelsbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 722 days.

(21) Appl. No.: 10/586,855

(22) PCT Filed: Sep. 29, 2004

(86) PCT No.: PCT/EP2004/010899

§ 371 (c)(1),
(2), (4) Date: May 21, 2007

(87) PCT Pub. No.: WO2005/068038

PCT Pub. Date: Jul. 28, 2005

(65) Prior Publication Data
US 2007/0289926 A1 Dec. 20, 2007

(30) Foreign Application Priority Data
Jan. 20, 2004 (EP) .................................. 04001043

(51) Int. Cl.
B01D 19/00 (2006.01)
(52) U.S. Cl. ......................................... 95/266; 96/143
(58) Field of Classification Search .................. 95/266; 96/93; 210/151, 767; 60/645
See application file for complete search history.

(56) References Cited

U.S. PATENT DOCUMENTS 5,671,601 A 9/1997 Bronicki et al.

FOREIGN PATENT DOCUMENTS

JP 60138213 A * 7/1985

* cited by examiner

Primary Examiner—Robert A Hopkins

(57) ABSTRACT

The invention relates to a method and a device for treating contaminated water in a steam power installation, and to a corresponding steam power installation. According to the invention, steam and water are separated between a first steam-collecting drum of a pressure level and a second steam-collecting drum of a lower pressure level.

14 Claims, 1 Drawing Sheet

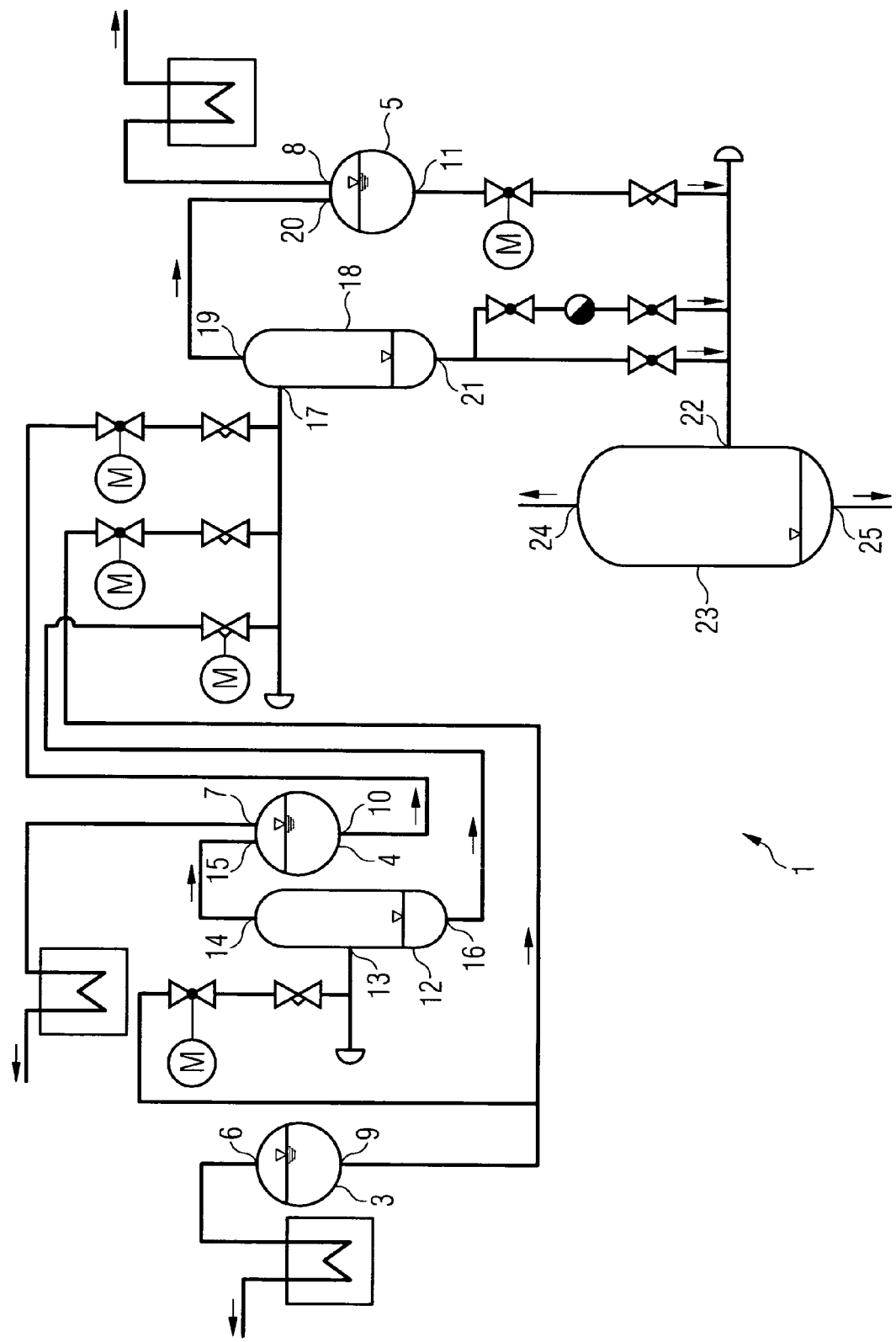

METHOD AND DEVICE FOR TREATING CONTAMINATED WATER

CROSS REFERENCE TO RELATED APPLICATIONS

This application is the U.S. National Stage of International Application No. PCT/EP2004/010899, filed Sep. 29, 2004 and claims the benefit thereof. The International Application claims the benefits of European Patent application No. 04001043.1 filed Jan. 20, 2004. All of the applications are incorporated by reference herein in their entirety.

FIELD OF THE INVENTION

The present invention relates to a method and device for treating contaminated water in a steam power plant. The present invention also relates to a steam power plant.

BACKGROUND OF THE INVENTION

Such a steam power plant generally contains a number of steam drums, with which steam is generated at different power levels, it being possible to feed said steam to a steam turbine in particular. Impurities in the water/steam circuit of the steam power plant must be removed. The impurities become more concentrated in the respective steam drum. The extraction of saturated steam from the steam drums causes non-volatile substances to remain in the steam drums. These non-volatile substances are removed from the circuit by elutriation. The circuit thereby loses energy and water, which has to be fed back in again in the form of additional water, known as deionized water. This incurs additional costs. It is also an environmental burden.

To keep energy losses low, it has already been proposed that the elutriation water should be transferred from the high-pressure level steam drums to the lower-pressure steam drums, in which it can expand (so-called boiler cascading blowdown). Some of the energy of the additionally introduced elutriation water can then be converted to power by evaporating it and routing the steam thus obtained to the steam turbine. One disadvantage of this is however that all the impurities are transferred from one pressure level to the next.

It is also known that the elutriated water in the steam drum of one pressure level can be expanded in a separator and the water and steam separated. The steam is then transferred at low pressure into a collection tank for degassing and to heat up the water contained therein.

SUMMARY OF THE INVENTION

The object of the invention is to allow contaminated water in a steam power plant with a number of pressure levels to be purified in a technically simple and effective manner.

This object is achieved according to the invention with a method and device for treating contaminated water in a steam power plant, wherein a water-steam separation operation takes place between a first steam drum of a first pressure level and a second steam drum of a lower second pressure level. The object is also achieved with a steam power plant, having an inventive device. The present invention allows the frequency of elutriation to be reduced compared with the prior art. It also allows the quantity of elutriation water to be disposed of and the consumption of deionized water supplied to be kept at a low level.

In one advantageous development of the invention, separated, contaminated water is fed to a collection tank for further processing during the water/steam separation operation. The elutriation water removed from a number of steam drums is thus collected centrally and then processed. The volume of the collection tank can be kept low.

Steam separated during the water/steam separation operation is advantageously fed to the second steam drum. This allows particularly good energy utilization, which ultimately results in an increase in the power that can be generated by the steam power plant.

In one advantageous embodiment of the invention the water/steam separation operation takes place between a third steam drum of a third pressure level, which is higher than the first pressure level, and the second steam drum. This allows elutriation to take place more effectively.

In a particularly advantageous embodiment of the invention a further water/steam separation operation takes place between the third steam drum and the first steam drum. Further inspissation (concentration) allows the elutriation flow to be reduced. Also the quantity of elutriation water to be disposed of and the consumption of deionized water supplied can be kept at a low level.

Steam separated in the further water/steam separation operation is advantageously fed to the first steam drum. This allows a further better utilization of energy.

Contaminated water separated during the further water/steam separation operation is fed into the first water/steam separation operation. The separated contaminated water can therefore be subjected to a double water/steam separation operation, allowing more energy to be recycled.

It is particularly advantageous for the water/steam separation operation to take place in a separator. This allows water and steam to be separated in a particularly simple and economic manner.

BRIEF DESCRIPTION OF THE DRAWING

An exemplary embodiment of the invention is described in more detail below with reference to the accompanying schematic drawing, in which:

The FIGURE shows an exemplary embodiment of an inventive device for treating contaminated water in a steam power plant.

DETAILED DESCRIPTION OF THE INVENTION

The FIGURE shows an inventive device in the form of a purification device 1, which is part of a steam power plant for power generation. To simplify the representation, elutriation paths in particular are shown from the steam power plant, which serve to remove elutriation water that occurs during the elutriation of steam drums of the steam power plant.

Within the steam power plant a high-pressure (HP) steam drum 3 is provided with an HP pressure level, a medium-pressure (MP) steam drum 4 is provided with an MP pressure level, which is lower than the HP pressure level, and a low-pressure (LP) pressure drum 5 is provided with an LP pressure level, which is lower than the MP pressure level. The steam drums 3, 4, 5 are used during operation of the steam power plant to generate steam from water contained in the steam drums 3, 4, 5, in each instance in an evaporator (not shown). This steam is fed via superheaters assigned to the steam drums 3, 4, 5 to one or more turbines in the steam power plant 2. The steam drums 3, 4, 5 therefore each have an upper outlet 6, 7 or 8, at which the steam can exit from the different pressure levels.

For the purposes of purification the steam drums 3, 4, 5 are elutriated. To this end they each have a lower outlet 9, 10 or 11, at which the concentrated, contaminated water from the steam drums 3, 4 or 5 is partially elutriated. The steam drums 3, 4, 5 are connected to each other via the elutriation lines mentioned above.

In order on the one hand to prevent elutriated impurities also being carried along in the elutriation path from one steam drum to the next and on the other hand to ensure that energy still contained in the elutriated water is largely utilized, the elutriation water is subjected to a water/steam separation operation. To this end a separating means in the form of a medium-pressure separator flask 12 is disposed in the elutriation path from the HP steam drum 3 to the MP steam drum 4, allowing a water/steam separation operation in the MP pressure level. The medium-pressure separator flask 15 has an inlet 13, which is connected to the lower outlet 9 of the HP steam drum 3 via an elutriation line. Elutriation water can be routed from the HP steam drum into the medium-pressure separator flask 12 via this elutriation line. The elutriation water can evaporate in the medium-pressure separator flask 12 according to the MP pressure level. The medium-pressure separator flask 12 has an upper outlet 14, which is connected to an inlet 15 of the MP steam drum 4. The steam separated in the medium-pressure separator flask 12 can be routed via this connection for recycling in the MP steam drum 4.

The medium-pressure separator flask 12 also has a lower outlet 16, which is connected via an elutriation line and a valve to an inlet 17 of a separating means in the form of a low-pressure separator flask 18, which makes a water/steam separation operation possible in the LP pressure level. Separated contaminated water can be routed into the low-pressure separator flask 18 via this lower outlet 16, so that said water can be subjected to the LP water/steam separation operation there. The lower outlet of the MP steam drum 4 is also connected via an elutriation line and a valve to the inlet 17 of the low-pressure separator flask 18, to introduce elutriated water. The elutriation water fed in can evaporate in the low-pressure separator flask 18 according to the LP pressure level.

The low-pressure separator flask 18 has an upper outlet 19, which is connected to an inlet 20 of the LP steam drum 5 for the introduction of separated steam. The low-pressure separator flask 18 also has a lower outlet 21, which is connected via an elutriation line and a valve to an inlet 22 of a collection tank 23 for the introduction of the separated contaminated water. The inlet 22 of the collection tank 23 is also connected via an elutriation line to the lower outlet 11 of the LP steam drum, to feed elutriated water from the LP steam drum to the collection tank 23. The collection tank 23 collects the contaminated separated elutriation water that is not further used and expands it there. The collection tank 23 has an upper outlet 24, at which steam is released either to the atmosphere or to a condenser (not shown), and a lower outlet 25, at which the remaining waste water condensate with the further concentrated impurities is disposed of from the circuit or reprocessed.

In the above exemplary embodiment two separator flasks 12 and 18 were advantageously used. It is also possible to provide just one or a number of these separator flasks. If only the low-pressure separator flask 18 is provided, the outlet 9 of the HP steam drum 3 is connected directly to the inlet 17 of the low-pressure separator flask 18, to introduce elutriated water.

The invention claimed is:

1. A method for treating contaminated water in a steam power plant, comprising:
    separating water and steam between a first steam drum having a first pressure level and a second steam drum having a second pressure level by a water/steam separator where the first steam drum has a greater pressure level than the second steam drum;
    feeding the separated water to the first steam drum; and
    feeding the separated steam to the second steam drum, wherein the separated water contains contaminants and is fed to a collection tank, and
    wherein a water and steam separation step is performed between the second steam drum and a third steam drum having a third pressure level that is greater than the first steam drum pressure.

2. The method as claimed in claim 1, wherein a water and steam separation step is performed between the third steam drum and the first steam drum.

3. The method as claimed in claim 2, wherein the steam separated between the third steam drum and the first steam drum is fed to the first steam drum.

4. The method as claimed in claim 2, wherein contaminated water separated between the third steam drum and the first steam drum is fed into the water and steam separation step between the first and second steam drum.

5. A device for treating contaminated water in a steam power plant, comprising:
    a first steam drum having a first pressure level;
    a second steam drum having a second pressure level less than the first pressure level; and
    a first separating device for separating water and steam connected to the first steam drum and the second steam drum,
    wherein a third steam drum having a third pressure level greater than the first pressure level is connected to the first separating device for separating water and steam.

6. The device as claimed in claim 5, wherein the first separating device is connected to and supplies separated contaminated water to a collection tank.

7. The device as claimed in claim 5, wherein the first separating device is connected to and supplies separated steam to the second steam drum.

8. The device as claimed in claim 5, wherein a second separating device for a second water and steam separation operation is arranged between the third steam drum and the first steam drum.

9. The device as claimed in claim 8, wherein the first separating device is connected to and supplies separated steam to the second steam drum.

10. The device as claimed in claim 8, wherein the first separating device is connected to the second separating device to supply contaminated water separated during the further water and steam separation operation.

11. The device as claimed in claim 5, wherein the first separating device and/or the second separating device is a separator.

12. A device for treating contaminated water in a steam power plant, comprising:
    a first steam drum having a first pressure level;
    a second steam drum having a second pressure level less than the first pressure level;
    a third steam drum having a third pressure level greater than the first pressure level;
    a first separating device for separating water and steam connected to the first, second and third steam drum; and
    a second separating device for separating water and steam connected to the third steam drum and the first steam drum.

13. The device as claimed in claim 12, wherein the first separating device is connected to the second separating device to supply contaminated water separated during the further water and steam separation operation.

14. The device as claimed in claim 12, wherein the first separating device and/or the second separating devices is a separator.

* * * * *